US009800562B2

(12) United States Patent
Lalwani et al.

(10) Patent No.: US 9,800,562 B2
(45) Date of Patent: Oct. 24, 2017

(54) CREDENTIAL RECOVERY

(71) Applicant: Barclays Bank PLC, London (GB)

(72) Inventors: Akhil Lalwani, London (GB); George French, Bedford (GB)

(73) Assignee: Barclays Bank PLC, London (GB)

( * ) Notice: Subject to any disclaimer, the term of this patent is extended or adjusted under 35 U.S.C. 154(b) by 207 days.

(21) Appl. No.: 14/096,517

(22) Filed: Dec. 4, 2013

(65) Prior Publication Data

US 2014/0156989 A1    Jun. 5, 2014

(51) Int. Cl.
*H04L 29/06* (2006.01)
*H04L 9/08* (2006.01)
*H04W 12/04* (2009.01)

(52) U.S. Cl.
CPC ............ *H04L 63/08* (2013.01); *H04L 9/0816* (2013.01); *H04L 9/0894* (2013.01); *H04W 12/04* (2013.01); *H04L 63/045* (2013.01); *H04L 63/0464* (2013.01); *H04L 2463/062* (2013.01)

(58) Field of Classification Search
CPC ..... H04L 63/08; H04L 9/0894; H04L 9/0816; H04L 2463/062; H04L 63/0464; H04W 12/04
USPC ......................................................... 713/155
See application file for complete search history.

(56) References Cited

U.S. PATENT DOCUMENTS

| | | | | |
|---|---|---|---|---|
| H002270 H | * | 6/2012 | Le Saint ........................ 713/168 |
| 2005/0182945 A1 | * | 8/2005 | Ali ............................ G06F 21/31 |
| | | | | 713/182 |
| 2007/0079143 A1 | * | 4/2007 | Fazal ....................... G06F 21/31 |
| | | | | 713/193 |
| 2007/0168656 A1 | * | 7/2007 | Paganetti ................ G06F 21/31 |
| | | | | 713/155 |
| 2007/0255943 A1 | * | 11/2007 | Kern ....................... H04L 9/0894 |
| | | | | 713/155 |
| 2009/0124234 A1 | | 5/2009 | Fisher et al. |
| 2009/0193511 A1 | * | 7/2009 | Noe ......................... G06F 21/34 |
| | | | | 726/9 |
| 2011/0302406 A1 | | 12/2011 | Machani |
| 2012/0072714 A1 | * | 3/2012 | Grandcolas ........... H04L 9/0825 |
| | | | | 713/155 |

(Continued)

FOREIGN PATENT DOCUMENTS

WO    WO 01/78491    10/2001
WO    WO 02/17674    2/2002

*Primary Examiner* — Jeffrey Pwu
*Assistant Examiner* — William Corum, Jr.
(74) *Attorney, Agent, or Firm* — Cowan, Liebowitz & Latman, P.C.; Steven D. Underwood

(57) ABSTRACT

In a credential recovery process, a user is authenticated using an application running on a mobile communications device, and requests recovery of a credential. The application generates a session key encrypted with the public key of a gateway, and sends the encrypted key to the gateway. The gateway recovers the credential from a depository, encrypted using a symmetric key shared with the depository. The gateway decrypts the credential and re-encrypts the credential using the session key. Preferably, the decryption and re-encryption is performed within a hardware secure module within the gateway. The re-encrypted credential is sent to the application, which decrypts the credential and outputs it to the user. In this way, the credential is provided securely to the user and may be made available for use immediately, or nearly so.

16 Claims, 4 Drawing Sheets

(56) References Cited

U.S. PATENT DOCUMENTS

| | | | |
|---|---|---|---|
| 2013/0013928 A1* | 1/2013 | Thom | G06F 21/31 |
| | | | 713/182 |
| 2013/0159699 A1* | 6/2013 | Torkkel | H04L 9/0897 |
| | | | 713/155 |
| 2013/0198824 A1* | 8/2013 | Hitchcock | G06F 21/00 |
| | | | 726/6 |
| 2014/0325231 A1* | 10/2014 | Hook | H04L 9/088 |
| | | | 713/171 |

* cited by examiner

CREDENTIAL RECOVERY

FIELD OF THE INVENTION

This invention relates to a system and method for credential recovery.

BACKGROUND OF THE INVENTION

Users of electronic payments systems and the like are typically required to authenticate themselves using one or more credential, such as a PIN or a passcode. For security reasons, it is important that the credentials are protected from unauthorised access; however, a legitimate user may forget a credential, and may therefore need to be re-advised of it in a secure manner. Conventionally, a user is authenticated manually, and the credential is sent out to the registered address of the user by mail.

The applicant's PCT Published Application No. WO-A-2007/096590 discloses a PIN servicing system using a smart card reader, in which a PIN servicing request is encrypted by the smart card and sent to a PIN servicing facility, which returns an encrypted PIN servicing message for decryption by the smart card. The PIN servicing message may include the user's PIN. Although this method is secure, it requires a dedicated smart card reader.

PCT Published Application No. WO-A-2010/028163 discloses a method of retrieving a PIN online, one character at a time. The PIN characters are decrypted before being sent to the user, and are therefore vulnerable to interception if the connection to the user is compromised.

SUMMARY OF THE INVENTION

In an embodiment of the invention, there is provided a credential recovery process in which a user is authenticated using an application running on a mobile communication device, and requests recovery of a credential. The application generates a session key encrypted with the public key of a gateway, and sends the encrypted key to the gateway. The gateway recovers the credential from a depository, wherein the credential has been encrypted using a symmetric key shared with the depository. The gateway decrypts the credential and re-encrypts the credential using the session key. Preferably, the decryption and re-encryption is performed within a hardware secure module within the gateway. The re-encrypted credential is sent to the application running on a mobile communication device, which decrypts the credential and outputs it to the user. In this way, the credential is provided securely to the user on a mobile communication device and may be made available for use immediately, or nearly so.

There may be provided a device, a credential server and associated computer programs arranged to carry out the above method.

BRIEF DESCRIPTION OF THE DRAWINGS

There now follows, by way of example only, a detailed description of embodiments of the present invention, with reference to the figures identified below.

DETAILED DESCRIPTION OF THE INVENTION

Figure 1:
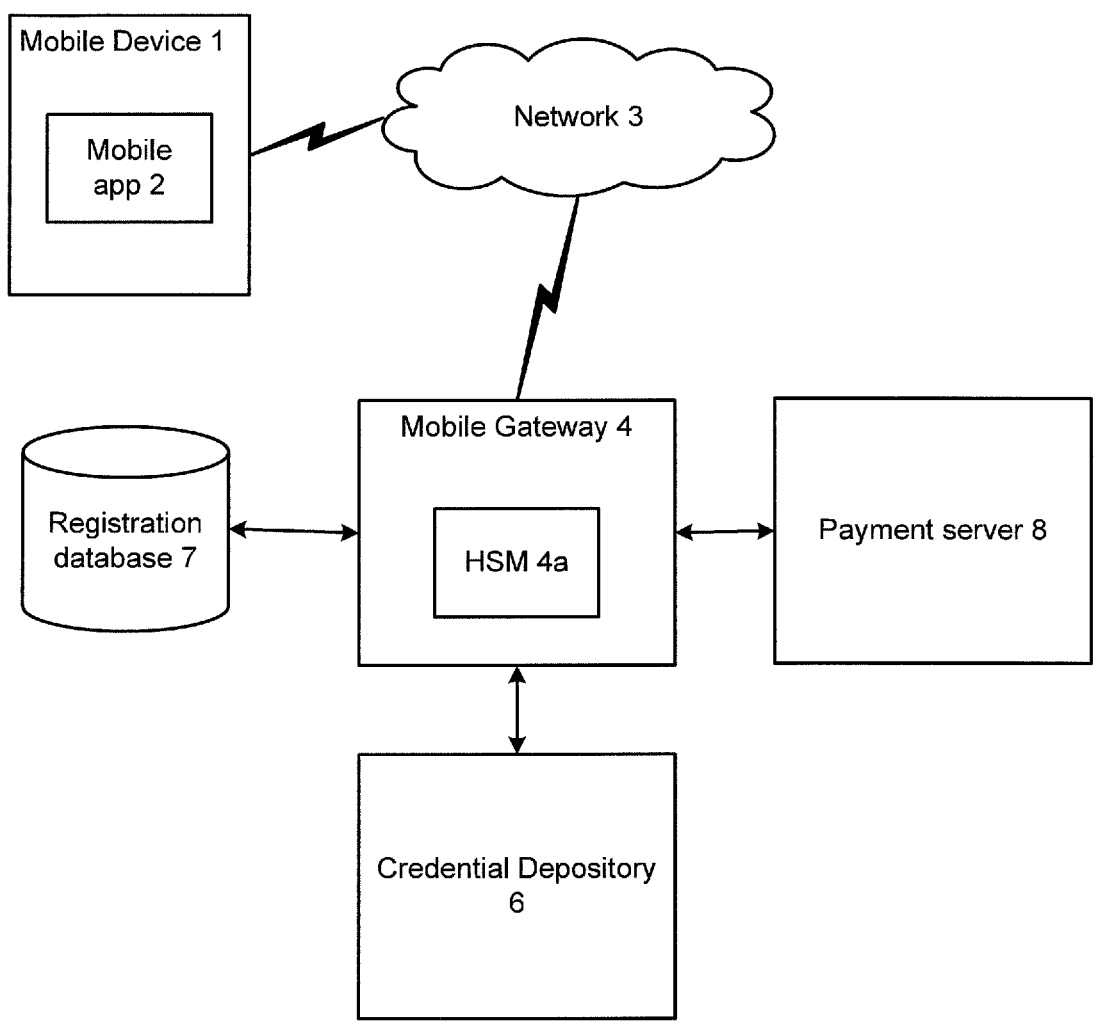
FIG. 1 is a diagram of the main components of a credential recovery system according to embodiments of the invention.

Referring to FIG. 1, a mobile credential recovery system according to embodiments of the invention comprises a wireless or mobile communication device 1 having a mobile application 2 (i.e. a computer program), connected or connectable to a mobile gateway 4 over a network 3. The mobile gateway 4 interacts with the mobile application 2 to perform one or more services for a user. For example, the services may include connections to one or more servers/services, either over the network 3 or via another secure connection. One such service is a credential recovery service, provided from a credential depository 6.

Another such service is a mobile payment service, provided by a payment server 8, by which the mobile gateway 4 authorises and processes payments by interaction with an authenticated user of the mobile application 2. The payment server 8 is connected to, or comprises a conventional payment fulfilment service of a type that is known per se to those skilled in the art. The payment fulfilment service executes requested payments between specified accounts.

Alternatively, the credential depository and/or the payment server may be integrated within the mobile gateway. In accordance with such an embodiment, the mobile gateway would then act as a server rather than as a gateway. In any case, the gateway 4 acts as a server to the mobile application 2.

The mobile gateway 4 has access to one or more database(s) 7 including registration data relating to the mobile application 2 and historical data relating to communication sessions or transactions with the mobile application 2.

The mobile gateway 4 includes a Hardware Security Module (HSM) 4a, such as a secure cryptoprocessor, within which recovered credential information is decrypted and re-encrypted, as described below. In this way, the decrypted credential information is protected within the mobile gateway 4.

The mobile communication device 1 is of a type that is known per se to those skilled in the art, such as an iOS™, Blackberry™ or Android™ based smartphone, a 'feature' phone, a personal digital assistant (PDA), a tablet computer, or any processor-powered device with suitable input and display means. In some embodiments, the mobile communication device 1 need not have a voice telephony function. The mobile communication device 1 is a terminal of the network 3.

The network 3 comprises a terrestrial cellular network such as a 2G, 3G or 4G network, a private or public wireless network such as a WiFi™-based network and/or a mobile satellite network or the Internet. It will be appreciated that a plurality of, and preferably a large number of, mobile communication devices 1 are operable concurrently within the system.

Prior to the credential recovery process, the user must install the mobile application 2 on the mobile communication device 1. As part of this process, the application 2 is registered with the mobile gateway 4, by providing verified user account information and by setting up a secure communications protocol between the application 2 and the gateway 4. The secure communications protocol between the application 2 and the gateway 4 is established by setting up one or more cryptographic keys generated by a passcode associated with a registered user. The key(s) are generated from the passcode as entered by the user during setup. The passcode is a PIN, graphical passcode and/or biometric data such as a fingerprint or iris scan. The passcode is modified by the user after setup.

In the specific embodiments described below, a user may be required to enter the passcode as part of an authentication process. The passcode is entered as a numeric or alphanumeric input, a graphical input such as a signature or gesture, or a biometric input. Preferably, the passcode is validated remotely, by generating a cryptographic key from the passcode, which key is used to sign a message sent to the mobile gateway 4 and/or a challenge sent by the mobile gateway 4. The mobile gateway 4 may only respond as described in the embodiments below if the resulting signature is validated. If not, the mobile gateway 4 may prompt the application 2 to request the passcode again. The mobile gateway 4 may block access by the application 2 if it presents an invalid signature more than a predetermined number of times. In this way, the authentication process is made resistant to 'brute force' attacks.

Alternatively, the entered passcode may be validated locally against a passcode stored in a local secure area of the mobile communication device 1. If the passcode is validated, then the application 2 is enabled to operate, as described in the specific embodiments below. This enablement may include access to locally stored cryptographic key(s) for secure communication with the mobile gateway 4.

Figure 2:
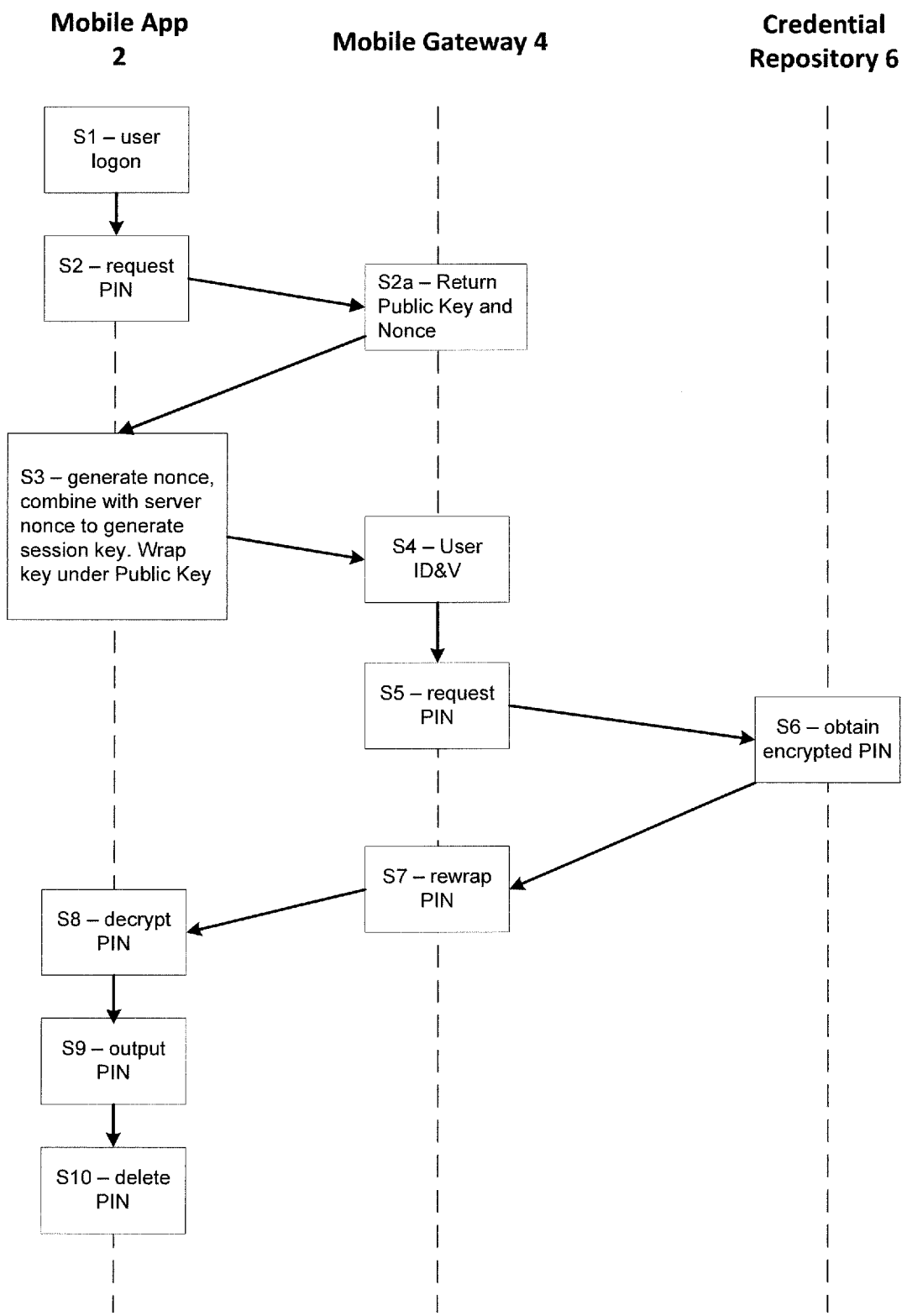
FIG. 2 is a flow diagram illustrating method steps in an embodiment of the invention.

As part of an account registration process, the user is provided with one or more credential(s) associated with a user account. The credential(s) may include a card PIN for authorising payment with a smart card associated with an account. The credential(s) are stored securely in the credential depository 6. In this embodiment, the credential(s) are encrypted with a symmetric depository key shared between the mobile gateway 4 and the credential depository 6. The symmetric depository key is a DES (Data Encryption Standard) key, but other symmetric key algorithms can be used, such as AES (Advanced Encryption Standard) or TDEA (Triple Data Encryption Algorithm)

Where the user requires recovery of the credential a credential recovery process is initiated. A credential recovery process in an embodiment of the present invention will now be described with reference to the steps S1 to S10 shown in FIG. 2. In this scenario, the user has forgotten their card PIN and wishes to recover it from the credential depository 6 in order to authorise a card payment. The user is enabled to recover the PIN with their mobile communication device 1, as described below.

S1—The user is authenticated with the application 2 by entering a passcode as described above. Note that this passcode is not the PIN that the user wishes to recover.

S2—If authenticated, the user gains access to the application 2 and selects a credential recovery function. For example, the credential recovery function in the present situation is 'request PIN'. The user selects, within the application 2, the credential that is required to be recovered. Where the user has multiple accounts, the user is prompted to select one from a plurality of different card accounts registered to the user, for which the PIN is to be recovered. The application 2 then makes a PIN request to the gateway 4.

S2a—The gateway 4 responds to the PIN request by returning the public element of an asymmetric key (e.g. an RSA public key) and a first nonce (a randomly or pseudo randomly generated one-time number).

S3—The application 2 generates a second nonce which it combines with the first nonce to create a session key, for use in the current credential recovery transaction. The session key is a symmetric key created using the AES-128 algorithm. It is appreciated the AES-128 algorithm is a 128-bit key Advanced Encryption Standard (AES) for the encryption of electronic data established by the U.S. National Institute of Standards and Technology (NIST). The application 2 encrypts the session key using the public key received from the gateway 4, preferably using encryption padding such as OAEP (Optimal Asymmetric Encryption Padding) using a secure hash algorithm (SHA) such as SHA-256. It is also appreciated SHA is a set of cryptographic hash functions designed by the U.S. National Security Agency (NSA). The application 2 then sends the encrypted session key to the mobile gateway 4, as part of a credential request message.

S4—The gateway 4 verifies that the credential request message has been sent by a valid user; this may be done using the registered keys generated from the passcode, as described above, and/or by prompting the application 2 to request user details, which are then passed to the gateway 4 and verified against user details stored on the database 7.

S5—If the credential request message is verified, the gateway 4 sends a message to the credential depository 6 requesting the PIN requested by the user.

S6—The credential depository 6 receives the PIN request message from the gateway 4, identifies the corresponding encrypted PIN, and returns the encrypted PIN to the gateway 4.

S7—The gateway 4 decrypts the session key using the private element of the asymmetric key. The gateway 4 decrypts ('unwraps') the encrypted PIN using the symmetric depository key, within the HSM 4a, then re-encrypts ('rewraps') the PIN within the HSM 4a using the session key created by the application 2, as described above. The re-encrypted PIN is then sent to the mobile application 2.

Optionally, the gateway 4 generates a hash-based message authentication code (HMAC) based on some or all of the components of the credential request, such as the encrypted session key received from the mobile application at step S3, and the encrypted PIN received at step S6. The HMAC is passed to the HSM 4a which validates the HMAC and only returns the re-encrypted PIN if the HMAC is valid. In this way, the HSM also validates the PIN request.

S8—The mobile application 2 decrypts the PIN, using the session key established by the mobile application 2 as described above.

S9—The mobile application 2 outputs the decrypted PIN to the user, by displaying the PIN or outputting the PIN in some other way, such as spoken audio. The PIN is preferably output in such a way as to prevent eavesdropping. For example, the application 2 displays the PIN to the user one character at a time, on request by the user, or only for a short period of time. Alternatively, the PIN is output as a series of vibrations only sensible by the person holding the mobile communication device 1.

S10—Once the PIN has been output to the user, it is preferred that the PIN is not stored locally on the mobile communication device 1, but is deleted for greater security. Deletion takes place automatically under the control of the application 2 after a predetermined length of time.

The above embodiments are described by way of example, and alternative embodiments which may become apparent to the skilled person on reading the above description may nevertheless fall within the scope of the claims.

Figure 3:
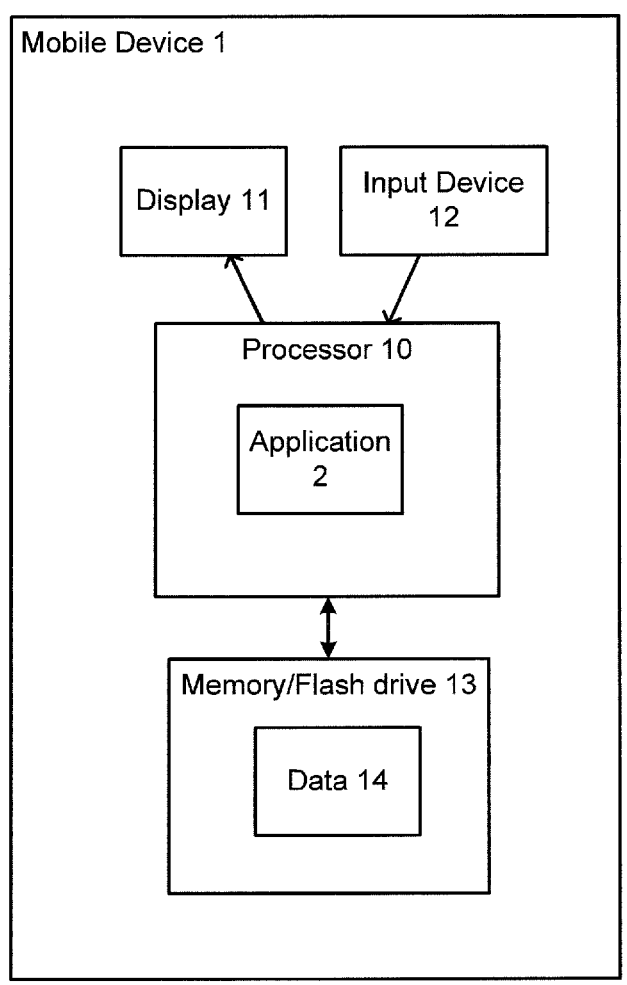
FIG. 3 is a diagram of a mobile communication device for use in embodiments of the invention.

FIG. 3 shows further details of an embodiment of the mobile communication device 1 comprising at least a processor 10, including hardware and an application platform, running the mobile payment application 2, and connected to memory or other form of data storage facility such as flash drive 13 storing local data 14. The application platform is a mobile operating system such as iOS™, Android™, Blackberry OS, Windows-based OS, or other embedded OS such as Open Embedded Build system, Symbian OS, Contiki, FreeBSD, and TinyOS. The application 2 comprises program code, which can be loaded or downloaded onto the mobile communication device 1.

The mobile communication device 1 has a display 11 and a manual input device 12, integrated with the display as a touchscreen, and/or provided as a keypad. An alternative or additional input device may be used, such as a trackball, trackpad, motion sensor or mouse.

The mobile communication device 1 includes a network interface 15 to the network 3.

Figure 4:
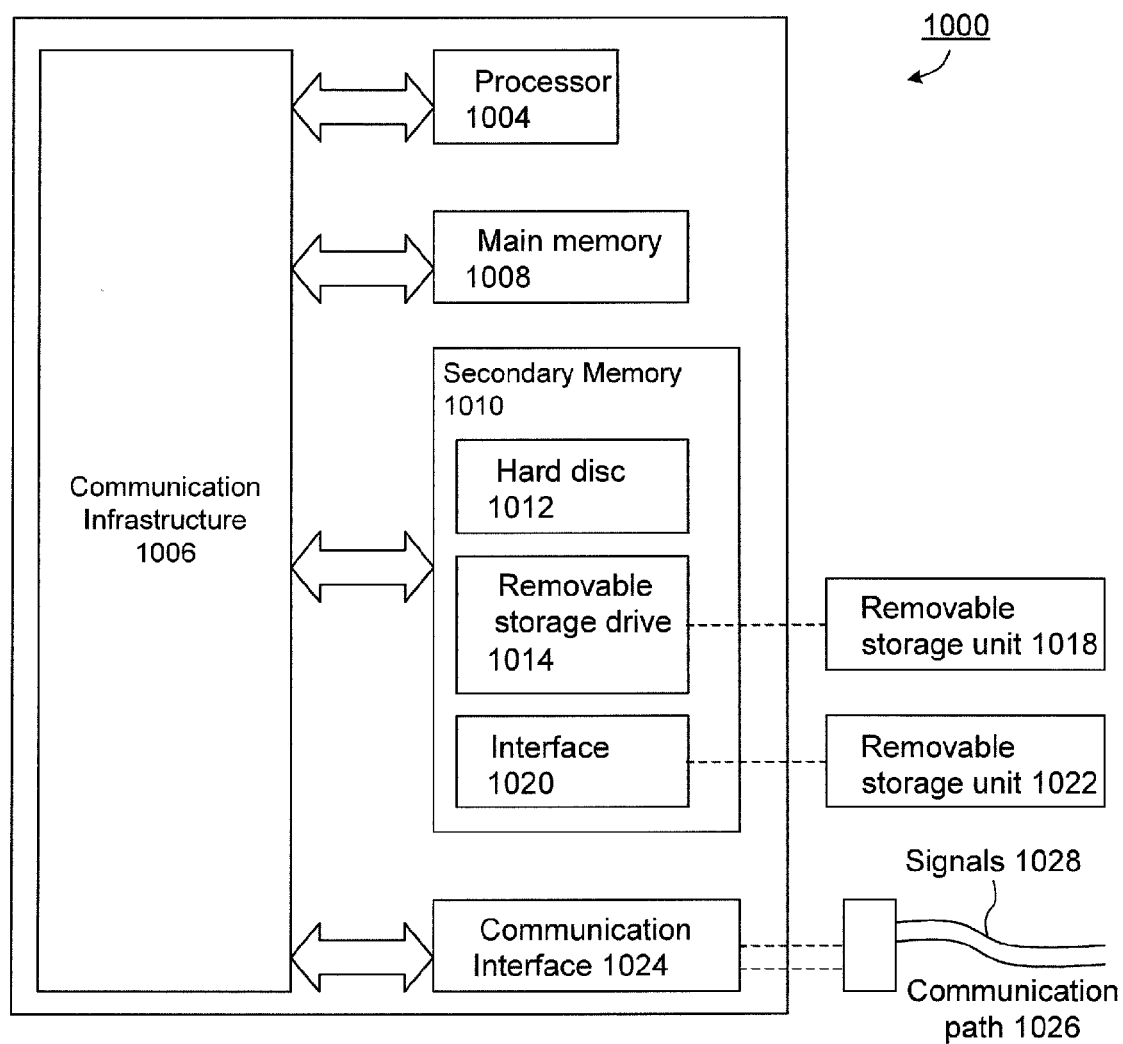
FIG. 4 is a diagram showing details of a computer system for use in embodiments of the invention.

The mobile gateway 4, credential depository 6 and/or the payment server 8 may be implemented by computer systems such as a computer system 1000 as shown in FIG. 4. Embodiments of the present invention may be implemented as programmable code for execution by such computer systems 1000. After reading this description, it will become apparent to a person skilled in the art how to implement the invention using other computer systems and/or computer architectures.

The computer system 1000 includes one or more processors 1004. The processor 1004 may be any type of processor, including but not limited to a special purpose or a general-purpose digital signal processor. The processor 1004 is connected to a communication infrastructure 1006 (for example, a bus or network). Various software implementations are described in terms of this exemplary computer system. After reading this description, it will become apparent to a person skilled in the art how to implement the invention using other computer systems and/or computer architectures.

The computer system 1000 also includes a main memory 1008, preferably random access memory (RAM), and may also include a secondary memory 1010. The secondary memory 1010 may include, for example, a hard disk drive 1012 and/or a removable storage drive 1014, representing a floppy disk drive, a magnetic tape drive, an optical disk drive, etc. the removable storage drive 1014 reads from and/or writes to a removable storage unit 1018 in a well-known manner. The removable storage unit 1018 represents a floppy disk, magnetic tape, optical disk, etc., which is read by and written to by the removable storage drive 1014. As will be appreciated, the removable storage unit 1018 includes a computer usable storage medium having stored therein computer software and/or data.

In alternative implementations, the secondary memory 1010 may include other similar means for allowing computer programs or other instructions to be loaded into the computer system 1000. Such means may include, for example, a removable storage unit 1022 and an interface 1020. Examples of such means may include a removable memory chip (such as an EPROM, or PROM, or flash memory) and associated socket, and other removable storage units 1022 and interfaces 1020 which allow software and data to be transferred from the other removable storage unit 1022 to the computer system 1000. Alternatively, the program may be executed and/or the data accessed from the removable storage unit 1022, using the processor 1004 of the computer system 1000.

The computer system 1000 may also include a communication interface 1024. The Communication interface 1024 allows software and data to be transferred between the computer system 1000 and external devices. Examples of the communication interface 1024 may include a modem, a network interface (such as an Ethernet card), a communication port, a Personal Computer Memory Card International Association (PCMCIA) slot and card, etc. Software and data transferred via the communication interface 1024 are in the form of signals 1028, which may be electronic, electromagnetic, optical, or other signals capable of being received by the communication interface 1024. These signals 1028 are provided to the communication interface 1024 via a communication path 1026. The communication path 1026 carries signals 1028 and may be implemented using wire or cable, fibre optics, a phone line, a wireless link, a cellular phone link, a radio frequency link, or any other suitable communication channel. For instance, communication path 1026 may be implemented using a combination of channels.

The terms "computer program medium" and "computer usable medium" are used generally to refer to media such as a removable storage drive 1014, a hard disk installed in hard disk drive 1012, and signals 1028. These computer program products are means for providing software to the computer system 1000. However, these terms may also include signals (such as electrical, optical or electromagnetic signals) that embody the computer program disclosed herein.

Computer programs (also called computer control logic) are stored in the main memory 1008 and/or the secondary memory 1010. Computer programs may also be received via the communication interface 1024. Such computer programs, when executed, enable the computer system 1000 to implement embodiments of the present invention as discussed herein. Accordingly, such computer programs represent controllers of the computer system 1000. Where the embodiment is implemented using software, the software may be stored in a computer program product and loaded into the computer system 1000 using the removable storage drive 1014, the hard disk drive 1012, or the communication interface 1024, to provide some examples.

Alternative embodiments may be implemented as control logic in hardware, firmware, or software or any combination thereof.

What is claimed is:

1. A method of credential recovery, comprising the steps of:
   authenticating a user with a mobile application on a mobile communication device, by entry of a previously registered passcode;
   receiving from the user an identification of a forgotten credential to be recovered using the mobile application;
   requesting the identified credential from a mobile application server using the mobile application;
   securely establishing a session key between the mobile application and the mobile application server;
   recovering from a credential depository the credential in encrypted form, encrypted using an encryption key different from the session key and independent from any information received by the mobile application server from the mobile application;
   decrypting the credential using said encryption key, and encrypting the credential using the session key, at the mobile application server;
   providing the credential encrypted using the session key to the mobile application; decrypting the credential encrypted using the session key at the mobile application to form a decrypted credential; and displaying the decrypted credential to the user from the mobile application;

wherein securely establishing a session key comprises generating the session key, encrypting the session key using one of a public key and a private key corresponding to the public key to form an encrypted session key, sending the encrypted session key, and decrypting the encrypted session key using the other of the public key and the private key corresponding to the public key.

2. The method of claim 1, wherein the mobile application server decrypts the credential encrypted using the encryption key within a hardware security module.

3. The method of claim 2, including providing to the hardware security module an authentication code based on one or more elements of the credential request, wherein the hardware security module validates the authentication code and provides the credential encrypted using the session key only if the authentication code is valid.

4. The method of claim 1, wherein the step of encrypting the session key includes padding the session key prior to encryption.

5. The method of claim 1, wherein the session key is generated using a nonce generated by the mobile application.

6. The method of claim 1, wherein the session key is generated using a nonce generated by the mobile application server.

7. The method of claim 1, including authenticating a user of the mobile application.

8. The method of claim 1, including deleting the credential from the mobile communication device after displaying the decrypted credential from the mobile application.

9. A method of operating a mobile application to recover a forgotten credential on a mobile communication device, comprising the steps of:
authenticating a user with the mobile application, by entry of a previously registered passcode;
receiving from the user an identification of a forgotten credential to be recovered;
requesting the identified credential from a mobile application server;
securely establishing a session key with the mobile application server;
receiving the credential, encrypted with the session key, from the mobile application server after the mobile application server has received from a credential depository the requested credential in encrypted form, encrypted using an encryption key different from the session key and independent from any information received by the mobile application server from the mobile application, and the mobile application server has decrypted the credential using the encryption key and encrypted the credential using the session key;
decrypting the credential using the session key to form a decrypted credential; and
displaying the decrypted credential to the user;
wherein securely establishing a session key comprises generating the session key, encrypting the session key using one of a public key and a private key corresponding to the public key to form an encrypted session key, sending the encrypted session key, and decrypting the encrypted session key using the other of the public key and the private key corresponding to the public key.

10. A method comprising:
establishing a secure session, using a session key, with a mobile application on a mobile communication device, after the mobile application has authenticated a user of the mobile communication device;
receiving a request from the mobile application for a forgotten credential identified by the user of the mobile communication device;
transmitting to a credential depository a request to recover the requested credential from a memory in encrypted form, encrypted using an encryption key different from the session key and independent from any information received at the mobile application server from the mobile application;
receiving the requested credential from the credential depository in said encrypted form;
decrypting the credential using the encryption key and encrypting the credential using the session key; and
transmitting the credential encrypted using the session key to the mobile application so that the mobile application can decrypt the encrypted credential using the session key and display the decrypted credential to the user;
wherein securely establishing a session key comprises generating the session key, encrypting the session key using one of a public key and a private key corresponding to the public key to form an encrypted session key, sending the encrypted session key, and decrypting the encrypted session key using the other of the public key and the private key corresponding to the public key.

11. A method as in claim 9, wherein the forgotten credential is a PIN for a payment card, and said PIN is not used for user authentication to the mobile application.

12. A method as in claim 9, wherein the encryption key is a symmetric depository key.

13. A method as in claim 9, wherein said passcode comprises biometric data.

14. A method as in claim 10, wherein the forgotten credential is a PIN for a payment card, and said PIN is not used for user authentication to the mobile application.

15. A method as in claim 10, wherein the encryption key is a symmetric depository key.

16. A method as in claim 10, wherein said passcode comprises biometric data.

* * * * *